No. 866,992. PATENTED SEPT. 24, 1907.
L. C. WETZEL.
COMPUTING SCALE.
APPLICATION FILED FEB. 7, 1907.
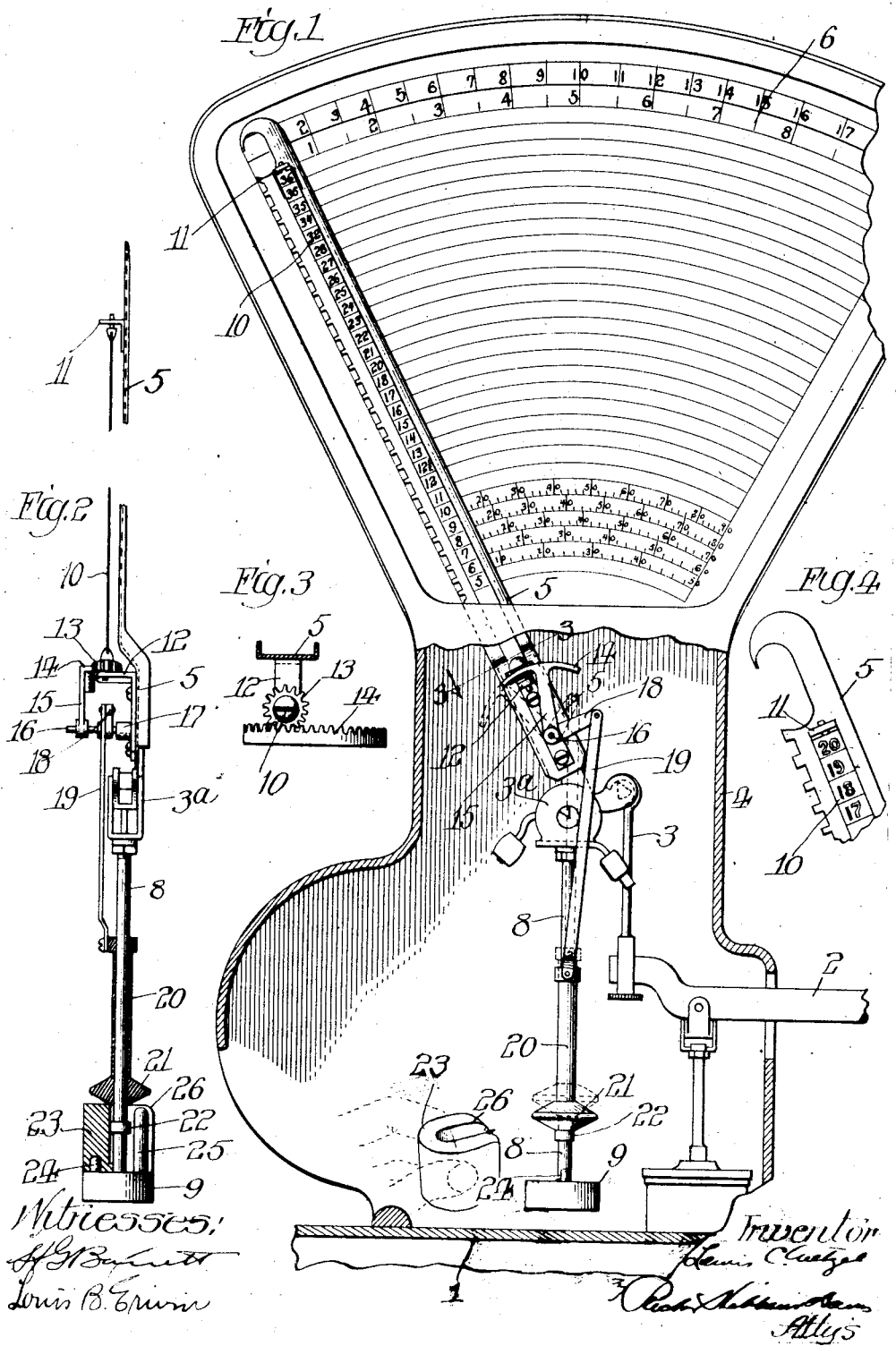

UNITED STATES PATENT OFFICE.

LEWIS C. WETZEL, OF TOLEDO, OHIO, ASSIGNOR TO TOLEDO COMPUTING SCALE COMPANY, OF TOLEDO, OHIO, A CORPORATION OF NEW JERSEY.

COMPUTING-SCALE.

No. 866,992.  Specification of Letters Patent.  Patented Sept. 24, 1907.

Application filed February 7, 1907. Serial No. 356,217.

*To all whom it may concern:*

Be it known that I, LEWIS C. WETZEL, residing at Toledo, in the county of Lucas and State of Ohio, have invented certain new and useful Improvements in Computing-Scales, of which the following is a specification.

In computing scales of the pendulum variety it is customary to provide for augmenting the weight of the pendulum so as to increase the weighing capacity of the scales at will and in order to adapt the chart and index hand to either normal or augmented capacity it has been customary to provide two rows of weight numerals on the chart, one made up of twice as many numerals as the other, and to inscribe upon the face of the index hand two parallel rows of price numerals, each numeral of one row being paired with a numeral of twice the value in the other row. Contrasting colors are generally employed to distinguish the two rows of weight numerals from each other and the two rows of price numerals from each other. The price row representing lesser values is of course used in conjunction with the row of weight numerals representing the augmented weighing capacity of the scales and these two coöperating rows of numerals have the same color while the contrasting color is used for the row of price numerals representing the greater values and for the row of weight numerals representing the lesser or normal weight capacity of the scales. The means for augmenting the counter-balancing properties of the pendulum generally takes the form of a ball weight which may be readily applied to and removed from the pendulum and it is customary to give this ball weight the same color as the row of lesser price numerals and the row of greater capacity weight numerals. Thus when the ball weight is on the pendulum its color is that of the price and weight numerals which are to govern in reading the scales. This simple color system has been found to fully satisfy all reasonable requirements in the matter of denoting how the scales shall be read when used at one weight capacity or the other. However, in order to remove any possibility of confusion in the use of the scales by inexperienced or unusually stupid or designing persons it has heretofore been proposed to provide for displaying only the row or set of price numerals of the greater values when the extra weight is off the pendulum and to display only the row or set of numerals of the lesser values when such weight is on the pendulum, thus rendering it impossible for the user to ignore the price numerals whose color alone should suffice to indicate how the scales are to be read. This has been accomplished through the employment of a reversible strip or bar on the index hand bearing the two rows of price numerals on opposite sides. This idea broadly is not of the present invention, which relates rather to a character of means for operating such a reversible bar not dependent upon the employment of any mechanism for removing and replacing the ball weight.

The present invention provides for reversal of the price numeral bar by the mere act of placing the ball weight upon the pendulum by hand and its like removal, the devices whereby the bar is thus operated being all carried by the pendulum or the index hand or both, so that the user of the scales does not have to concern himself at all about any particular disposition of the pendulum when the weight is applied or removed.

In the drawings, which accompany and form part of this specification, Figure 1 represents, for the most part in front elevation, a portion of a computing scale of a familiar type having the improvements of the present invention embodied therein. In this view full lines represent the normal position of devices for reversing the price numeral bar, *i. e.*, the position of such devices when the removable weight is not on the pendulum, and dotted lines represent the changed position of these devices when the said weight is upon the pendulum. The so-called ball weight is shown in this view in perspective as though about to be applied to the pendulum; Fig. 2 represents the pivotal weighing structure for the most part in side elevation, but with some parts, including the reversible weight, in section, such weight being here shown upon the pendulum; Fig. 3 is a cross section on an enlarged scale taken on the line 3—3 of Fig. 1; and Fig. 4 is a fragmentary front elevation of the index hand showing the price numeral bar reversed as compared with the illustration in Fig. 1.

The invention is illustrated by preference as applied to the type of computing scales shown in DeVilbiss reissue Patent 12,029, dated Sept. 9, 1902, but is not to be understood as necessarily limited to such application. Reference may be had to said patent for the details of construction and mode of operation of this particular type of scales. It will suffice for the purpose of the present specification to designate a few of the familiar parts going to make up such scales. Above a suitable supporting base 1 is arranged a scale beam 2 connected by a link 3 with a pivot piece 3ª within a housing 4 erected on the base 1. An index hand 5 is rigidly secured to said pivot piece on the upper side of the pivot and the stem 8 of the pendulum is rigidly secured to said pivot piece on the lower side of the pendulum, said pendulum having a permanent weight 9 at its lower end. The index hand as usual extends over a chart 6 within a fan-shaped portion of the casing or housing, said chart being made up of concentric rows of computation numerals and two outer rows of weight numerals. Instead of inscribing the face of the index hand with two parallel rows of price numerals, there is mounted upon the index-hand a bar 10 journaled at its ends in brackets 11 and 12 secured to the index hand, said bar having the two sets of price numerals inscribed on its opposite sides. Thus when the bar is turned one way a set of price numerals is exposed suitable for use when the scale is weighing in its lower capacity, i. e., when the removable weight is off the pendulum. A reversal of the bar will of course carry this particular set of numerals out of view and expose the other set which is suitable for use when the scale is weighing in its larger capacity, i. e., when the ball weight is on the pendulum.

The above described reversible bar carries at its lower end a toothed gear wheel 13 with which meshes a crown segment 14 formed at the end of an arm 15, which is secured to a rock shaft 16, the latter being journaled in a bearing 17 fastened to the index hand. There is also secured to this rock shaft a radial arm 18 projecting at an angle to the arm 15 and having jointed to its outer end the upper end of a pitman 19. The lower end of this pitman is jointed to a sleeve 20 slidably mounted upon the stem 8 of the pendulum and formed with a lower enlarged end portion 21 of double-conical form. Normally this lower end portion of the sleeve rests by gravity upon a shoulder provided by an enlargement 22 of said pendulum stem, the weight of the sleeve being sufficient to maintain this position as the pendulum swings to and fro. Of course the size of the enlarged part of the sleeve can be regulated to suit requirements in this regard. Under such normal conditions, i. e., with the removal weight off the pendulum and the weighted sleeve lowered, the segment 14 is held over to the right as the parts appear in Fig. 1. This results in maintaining the reversible bar 10 in position to expose to view the price numeral suitable for use while the scale is weighing in its lower capacity.

The removable weight 23 is of general cylindrical form, radially slotted to embrace the pendulum stem in axial alinement therewith. It is preferably formed with a socket to receive a short pin 24 on the permanent weight 9 and the latter, which is of disk form and horizontally disposed, has a long upstanding pin 25 to occupy the radial slot of the removable weight when the latter is on the pendulum. This removable weight is beveled or rounded off, as shown at 26 in Fig. 2, on each side of its slot for the purpose of coacting with the sleeve 20 to thrust the same upwardly. It will be obvious that when the removable weight is introduced over the permanent pendulum weight the beveled or rounded portions 26 will act against the conical under-portion of the enlargement 21 of said sleeve with a camming effect and thus lift the sleeve. This results in rocking the arm 18 upward and the arm 15 to the left, thereby causing the segment 14 to turn the gear wheel 13 and reverse the bar 10 so that the other set of price numerals will be exposed. This condition obtains as long as the weight remains upon the pendulum. When it is removed the sleeve 20 immediately drops and through the connections described the bar 10 is turned back to its original position.

It will be seen that through the described instrumentalities the mere placing by hand of the ball weight upon the pendulum will automatically result in exposing the proper set of price numerals and concealing the other set and, vice versa, the mere removal by hand of the ball weight will automatically result in reversing the price numeral bar. Thus the object primarily stated is thoroughly fulfilled.

What is claimed is:

1. In apparatus of the character described, the combination with a pendulum and a removable weight therefor; of an index hand having a reversible strip or bar bearing a set of numerals on each side, and means carried by the hand and pendulum and controlled by the removable weight for determining which side of the reversible bar shall be exposed.

2. In apparatus of the character described, the combination with a pendulum and a removable weight therefor; of an index hand having a reversible strip or bar bearing a set of numerals on each side, a slide-piece on the pendulum controlled by the removable weight, and operative connections between said slide-piece and the reversible strip or bar.

3. In apparatus of the character described, the combination with a pendulum and a removable weight therefor; of an index hand having a reversible strip or bar bearing a set of numerals on each side, a sliding collar or sleeve on the pendulum controlled by the removable weight, and operating connections between said sleeve and the reversible bar.

4. In apparatus of the character described, the combination with a pendulum and a removable weight therefor; of an index hand having a reversible strip or bar bearing a set of numerals on each side, and a gravity slide-piece on the pendulum operatively connected with the reversible bar and adapted to be lifted by the removable weight when the latter is applied to the pendulum.

5. In apparatus of the character described, the combination with a pendulum and a removable weight therefor; of an index hand having a reversible strip or bar bearing a set of numerals on each side, and a gravitating sleeve or collar on the pendulum operatively connected with the reversible bar and having a tapering end portion adapted to be acted upon by the removable weight to move said sleeve when said weight is applied to the pendulum.

6. In apparatus of the character described, the combination with a pendulum and a removable weight therefor; of an index hand having a reversible strip or bar bearing a set of numerals on each side, a slide-piece on the pendulum controlled by the removable weight, a pitman connected with said slide-piece, a rock-arm connected with said pitman, and connections between the rock-arm and the reversible bar.

7. In apparatus of the character described, the combination with a pendulum and a removable weight therefor; of an index hand having a reversible strip or bar bearing a set of numerals on each side, a sliding collar or sleeve on the pendulum controlled by the removable weight, a pitman connected with said sleeve, a rock-arm connected with said pitman, and connections between the rock-arm and the reversible bar.

8. In apparatus of the character described, the combination with a pendulum and a removable weight therefor; of an index hand having a reversible strip or bar bearing a set of numerals on each side, a gravitating sleeve or collar on the pendulum operatively connected with the reversible bar and having a tapering end portion adapted to be acted upon by the removable weight to move said sleeve when said weight is applied to the pendulum, a pitman connected with said sleeve, a rock-arm connected with said pitman, and connections between the rock-arm and the reversible bar.

9. In apparatus of the character described, the combination with a pendulum and a removable weight therefor; of an index hand having a reversible strip or bar bearing a set of numerals on each side, a gear wheel on said bar, an oscillatory segment on the index hand and engaged with said gear wheel, and means carried by the pendulum and controlled by the removable weight and operatively connected with said segment.

10. In apparatus of the character described, the combination with a pendulum and a removable weight therefor; of an index hand having a reversible strip or bar bearing a set of numerals on each side, a gear wheel on said bar, an oscillatory segment on the index hand and engaged with said gear wheel, and a slide-piece on the pendulum controlled by the removable weight and operatively connected with the said segment.

11. In apparatus of the character described, the combination with a pendulum and a removable weight therefor; of an index hand having a reversible strip or bar bearing a set of numerals on each side, a gear wheel on said bar, an oscillatory segment on the index hand and engaged with said gear wheel, a slide-piece on the pendulum controlled by the removable weight, and a pitman connected with said slide-piece and cranked to the oscillatory segment.

12. In computing scales, the combination of a chart of computation numerals arranged in concentric rows, an index hand adapted to sweep over said chart, a strip or bar extending lengthwise said index hand and bearing a set of price numerals on each side and journaled at its ends on bearings on the index hand, a toothed gear wheel secured to said bar, a toothed segment mounted to oscillate on the index hand in mesh with said gear wheel, a radial arm compounded with said segment, a pendulum compounded with the index arm, a weight adapted to be removably applied to said pendulum, a sleeve on the latter with an enlarged conical end portion adapted to be acted upon by said weight, and a pitman connecting said sleeve with the before-mentioned radial arm.

LEWIS C. WETZEL.

Witnesses:
ALLEN DE VILBISS, Jr.,
C. DE LONG.